P. DISMUKES.
Gathering Clover Seed.
No. 84,416.             Patented Nov. 24, 1868.
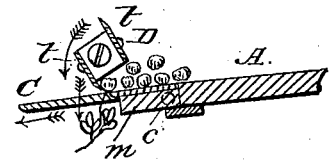
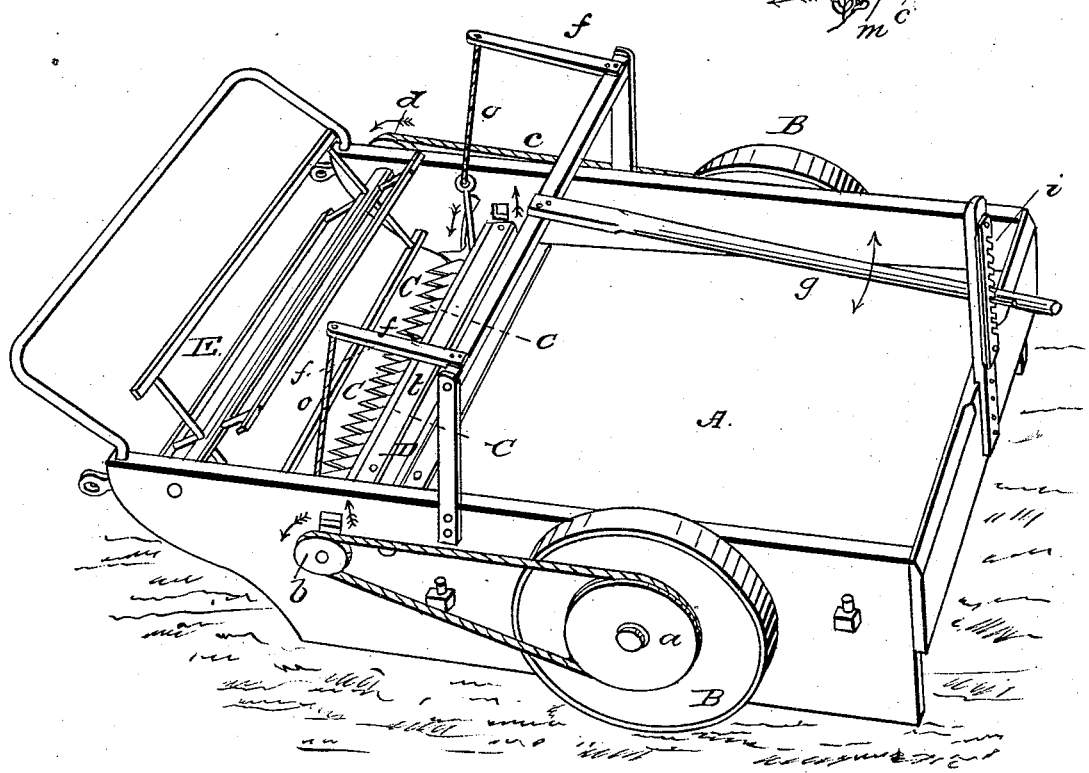
Witnesses
L. Harler.
P. T. Dodge.
Inventor
P. Dismukes
by Dodge & Munn
his Atty

United States Patent Office.

PAUL DISMUKES, OF GALLATIN, TENNESSEE.

Letters Patent No. 84,416, dated November 24, 1868.

IMPROVEMENT IN CLOVER-HARVESTERS.

The Schedule referred to in these Letters Patent and making part of the same.

*To all whom it may concern:*

Be it known that I, PAUL DISMUKES, of Gallatin, in the county of Sumner, and State of Tennessee, have invented certain new and useful Improvements in Machines for Gathering Clover and Grass-Seed; and I do hereby declare that the following is a full, clear, and exact description thereof, reference being had to the accompanying drawings, making part of this specification, and to the letters of reference marked thereon, like letters indicating like parts wherever they occur.

To enable others skilled in the art to construct and use my invention, I will proceed to describe it.

This invention consists in a novel construction and arrangement of mechanism for gathering clover and other similar seeds.

In the drawing—

Figure 1 is a perspective view of my machine complete.

Figure 2, a vertical section through the finger-bar and revolving cutter.

The machine consists of a body, A, mounted upon the wheels B, and armed at its front side with the stationary fingers or teeth C, to hold the blades of clover or grass, which are carried against them by the reel E, and the heads cut off by the revolving blades D, motion being imparted to the reel and cutter by belts and pulleys connected with the wheels B, as hereinafter more fully explained, the whole being drawn by a horse or horses attached in any suitable manner.

The fingers C are secured to the upper side of a bar, $m$, which is hinged to the front edge of the platform A, as shown in fig. 2, and may be adjusted higher or lower by the lever $g$, which operates the arms $f$, connected by chains, $o$, to the free side of the said bar $m$, the lever $g$ being held in place by the rack $i$, secured to a standard on the rear end of the body A, all as shown in fig. 1.

The fingers C are so placed as to leave room for the entrance of the stems or blades of grass between them, but not the heads, so that when the fingers are so adjusted as to run below the heads, they will ride upon the upper side of the fingers, while the stems pass up between, until the cutter D reaches them, when the heads are cut off and thrown back up the platform, as shown in fig. 2.

The cutter consists of a square shaft, D, having metallic blades, $t$, bolted to its two opposite sides, and having their edges projecting beyond the face of the shaft, as represented in fig. 2.

The cutter-shaft D is provided on one end with a pulley, $b$, driven by a belt from the pulley $a$, secured to the outer side of the driving-wheel B.

The reel E is driven by a belt from a pulley on the driving-wheel on the opposite side of the machine, as shown in fig. 1.

The cutter D is made adjustable, as shown in fig. 1, so as to cut nearer to or further from the fingers.

The fingers C may be made separately, and bolted in place, or of a single piece of metal, with the slits or openings cut into its edge.

It is obvious that two or more sets of fingers, differing in shape or size, may be fitted to one machine, so as to be interchangeable for different kinds of grass.

This machine is entirely automatic in its operation, after the teeth have been adjusted, is cheap, strong, and simple, and answers perfectly the purpose for which it is intended.

Having thus described my invention,

What I claim, is—

1. A machine for gathering clover or grass-seed, having the adjustable fingers C, reel E, and cutter D, all constructed and combined substantially as set forth.

2. The combination of the adjustable fingers C and the rotating cutter D, when said parts are constructed and arranged to operate as herein described.

PAUL DISMUKES.

Witnesses:
  GEO. B. GUILD,
  JOHN F. WHITE.